US011102255B2

(12) United States Patent
Davis et al.

(10) Patent No.: US 11,102,255 B2
(45) Date of Patent: Aug. 24, 2021

(54) PROJECT CREATION AND DISTRIBUTION SYSTEM

(71) Applicant: FILMIO, INC., San Diego, CA (US)

(72) Inventors: Christopher J. Davis, San Diego, CA (US); Don Richmond, San Diego, CA (US); Corey Hertz, San Diego, CA (US); Bob Giargiari, Del Mar, CA (US); Bryan Hertz, San Marcos, CA (US); Kevin Hertz, Escondido, CA (US); Ian LeWinter, San Diego, CA (US)

(73) Assignee: FILMIO, INC., San Diego, CA (US)

( * ) Notice: Subject to any disclaimer, the term of this patent is extended or adjusted under 35 U.S.C. 154(b) by 0 days.

(21) Appl. No.: 16/396,523

(22) Filed: Apr. 26, 2019

(65) Prior Publication Data
US 2019/0334957 A1 Oct. 31, 2019

Related U.S. Application Data

(60) Provisional application No. 62/663,479, filed on Apr. 27, 2018.

(51) Int. Cl.
H04L 29/06 (2006.01)
G06F 3/0481 (2013.01)
(Continued)

(52) U.S. Cl.
CPC .......... H04L 65/403 (2013.01); G06F 3/0481 (2013.01); G06Q 10/103 (2013.01); H04L 65/60 (2013.01); G06Q 20/10 (2013.01)

(58) Field of Classification Search
CPC ..... H04L 65/403; H04L 65/60; G06F 3/0481; G06Q 10/103; G06Q 20/10
See application file for complete search history.

(56) References Cited

U.S. PATENT DOCUMENTS 6,430,538 B1    8/2002  Bacon et al.
8,661,353 B2 *  2/2014  Mattingly .............. G06Q 10/10
                                                    715/756
(Continued)

FOREIGN PATENT DOCUMENTS

TW        200836526         9/2008

OTHER PUBLICATIONS

Search Report and Written Opinion for Application No. PCT/US2019/029300 dated Jul. 10, 2019 in 19 pages.
(Continued)

Primary Examiner — Sumaiya A Chowdhury
(74) Attorney, Agent, or Firm — Knobbe, Martens, Olson & Bear LLP

(57) ABSTRACT

An embodiment comprises methods of managing and systems for processing media projects. The project processing system comprises a hardware processor and a communication circuit. The processor receives a first request from a first viewer to view first media content, determine whether the first viewer is permitted to view the first media content, provide a first viewer interface to the first viewer permitted to view the first media content, the first viewer interface enabling the first viewer to stream or download the first media content, determine that the first viewer requests to share viewing of the first media content with at least one additional viewer, and enable the first viewer to share viewing of the first media content with the at least one additional viewer. The communication circuit provides the first media content to the first viewer and the at least one additional viewer for streaming or downloading over a network.

19 Claims, 5 Drawing Sheets

(51) Int. Cl.
*G06Q 10/10* (2012.01)
*G06Q 20/10* (2012.01)

(56) References Cited

U.S. PATENT DOCUMENTS

| | | | | |
|---|---|---|---|---|
| 10,438,290 | B1* | 10/2019 | Winklevoss | G06Q 20/223 |
| 2005/0120127 | A1* | 6/2005 | Bradley | G11B 27/034 |
| | | | | 709/231 |
| 2007/0162340 | A1* | 7/2007 | Spinoso | G06Q 30/02 |
| | | | | 705/14.14 |
| 2010/0011292 | A1* | 1/2010 | Marinkovich | G06F 3/0481 |
| | | | | 715/716 |
| 2010/0131385 | A1 | 5/2010 | Harrang et al. | |
| 2010/0326256 | A1 | 12/2010 | Emmerson | |
| 2011/0066601 | A1 | 3/2011 | Rieger | |
| 2011/0251841 | A1 | 10/2011 | Cook et al. | |
| 2012/0324002 | A1* | 12/2012 | Chen | G06F 16/54 |
| | | | | 709/204 |
| 2013/0170672 | A1* | 7/2013 | Groeschel | H03G 3/3005 |
| | | | | 381/119 |
| 2015/0089530 | A1* | 3/2015 | Abele | H04N 21/4884 |
| | | | | 725/25 |
| 2017/0046694 | A1 | 2/2017 | Chow et al. | |

OTHER PUBLICATIONS

International Preliminary Report on Patentability for Application No. PCT/US2019/029300 dated Oct. 27, 2020 in 7 pages.

\* cited by examiner

PROJECT CREATION AND DISTRIBUTION SYSTEM

CROSS-REFERENCE TO RELATED APPLICATIONS

This application claims the benefit of priority to United States provisional Patent Application No. 62/663,479, filed Apr. 27, 2018 and titled "PROJECT CREATION AND DISTRIBUTION SYSTEM", which is incorporated by reference herein in its entirety for all purposes.

FIELD

The present disclosure relates generally to creating, maintaining, and managing various online projects. More particularly, the present disclosure relates to a project management platform system that uses blockchain for managing creation of entertainment projects from a plurality of devices and users.

SUMMARY OF THE DISCLOSURE

The systems, methods, and devices described herein each have several aspects, no single one of which is solely responsible for its desirable attributes. Without limiting the scope of this disclosure, several non-limiting features will now be described briefly.

In a first aspect, a project processing system for social viewing is described. The project processing system comprises a hardware processor and a communications circuit. The hardware processor is configured to execute computer-executable instructions. The hardware processor executes the computer-executable instructions in order to receive a first request from a first viewer to view first media content of a first media project of a plurality of media projects, the plurality of media projects each comprising media content related to the respective media project and identities of one or more viewers permitted to view the respective media content and determine whether the first viewer is permitted to view the first media content. The hardware processor further executes the computer-executable instructions in order to based on a determination that the first viewer is permitted to view the first media content, provide a first viewer interface to the first viewer, the first viewer interface enabling the first viewer to stream or download the first media content and determine, based on a second request received from the first viewer, that the first viewer requests to share viewing of the first media content with at least one additional viewer. The hardware processor also executes the computer-executable instructions in order to enable the first viewer to share viewing of the first media content with the at least one additional viewer, wherein the at least one additional viewer is enabled to stream or download the first media content for shared viewing with the first viewer. The communication circuit is configured to provide the first media content to the first viewer and the at least one additional viewer for streaming or downloading over a network.

In another aspect, another project processing system for social viewing is described. The project processing system comprises a hardware processor and a communications circuit. The hardware processor is configured to execute computer-executable instructions. The hardware processor executes the computer-executable instructions in order to receive a first request from a first viewer to view first media content of a first media project of a plurality of media projects, the plurality of media projects each comprising media content related to the respective media project and identities of one or more viewers permitted to view the respective media content and generate a first viewer interface to the first viewer, the first viewer interface configured to enable the first viewer to stream or download the first media content. The hardware processor further executes the computer-executable instructions in order to determine that additional content for the first media project is available for viewing by the first viewer, the additional content including an interview, a question and answer session, or real-time commentary related to the first media content and enable the first viewer to view the additional content along with the first media content. The communication circuit is configured to provide the first media content and the additional content to the first viewer for streaming or downloading over a network In another aspect, a method for social viewing a media project is described. The method comprises receiving a first request from a first viewer to view first media content of a first media project of a plurality of media projects, the plurality of media projects each comprising media content related to the respective media project and identities of one or more viewers permitted to view the respective media content and determining whether the first viewer is permitted to view the first media content. The method also comprises based on a determination that the first viewer is permitted to view the first media content, providing a first viewer interface to the first viewer, the first viewer interface enabling the first viewer to stream or download the first media content and determining, based on a second request received from the first viewer, that the first viewer requests to share viewing of the first media content with at least one additional viewer. The method further comprises enabling the first viewer to share viewing of the first media content with the at least one additional viewer, wherein the at least one additional viewer is enabled to stream or download the first media content for shared viewing with the first viewer and providing the first media content to the first viewer and the at least one additional viewer for streaming or downloading over a network.

In another aspect, another method for social viewing a media project is described. The method comprises receiving a first request from a first viewer to view first media content of a first media project of the plurality of media projects, the plurality of media projects each comprising media content related to the respective media project and identities of one or more viewers permitted to view the respective media content and generating a first viewer interface to the first viewer, the first viewer interface configured to enable the first viewer to stream or download the first media content. The method further comprises determining that additional content for the first media project is available for viewing by the first viewer, the additional content including an interview, a question and answer session, or real-time commentary related to the first media content and enabling the first viewer to view the additional content along with the first media content. The method also comprises providing the first media content and the additional content to the first viewer for streaming or downloading over a network.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of disclosure.

DETAILED DESCRIPTION

Figure 1:
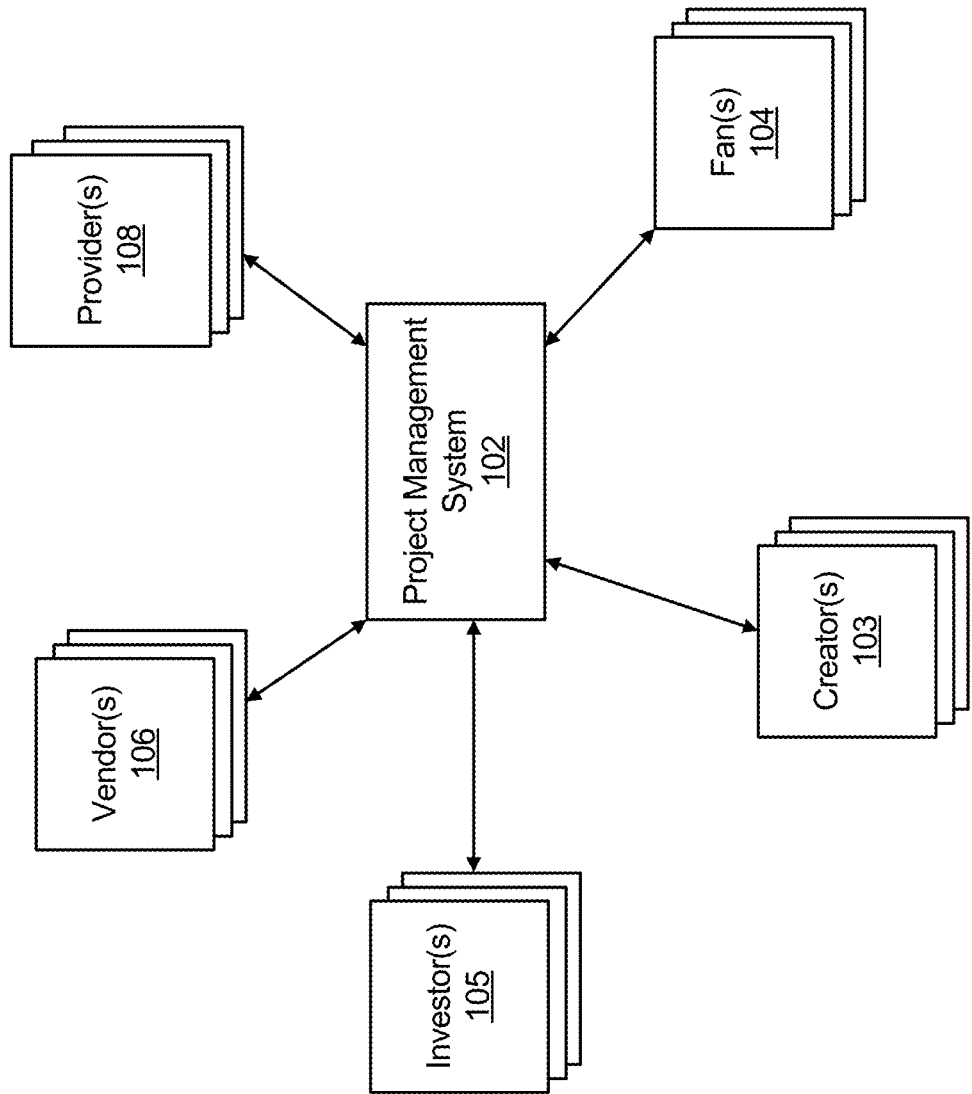
FIG. 1 illustrates a high-level overview of an example networked system for producing a video project.

In general, in the production and creation of entertainment, such as movies and television programs, the viewing public has little to nothing invested and no input in the production. Large production studios and filmmakers in Hollywood make the production and creation determinations and receive returns on these productions. Accordingly, the public has little invested in the content they watch at home via television or over the Internet or what is presented in movie theaters. However, the unpredictable nature of viewer consumption and preferences has shown that studios invest and produce numerous programs that fail to connect with the public, resulting in wasted resources that may be distributed elsewhere.

Recently, advances in computer technology and changes in the law have made it easier for individuals to partake in the production of and investment in such programs. Each term may refer to the collective effort of individual investors who pool resources together in order to support efforts initiated by other people or organizations in exchange for returns and an ability to provide input into the effort.

Embodiments of the invention relate to an electronic platform for creating, maintaining, and managing the creation and distribution of a project. The project may include creative content, such as a movie or video. The platform may provide the necessary interconnections between devices on a network to facilitate creation, production, and distribution of a project. For example, a first user on the platform may have an idea for a movie or television program project. The first user may use the platform to upload a video presentation, slides, or description of the project to other interconnected users. The interconnected users may be, for example, fans or investors, who may provide financial support as well as input and services to further the creation of the project. Thus, the platform allows other users, who traditionally were only able to view programs, to have access to invest or provide input on the creation of the project.

Definitions:

Browser and Web Page: A browser is a computer program that provides functionality to a computer for executing syntax contained in web pages. The computer may be connected to a computer network, and the network may be, and usually will be, the Internet. As used herein, browsers and web pages together provide functionality to a computer connected to the network (for example the Internet) at least sufficient to request, retrieve, and display at least some network resources including web pages themselves, and to execute at least some links contained within or referred to in retrieved web pages to retrieve other web pages specified with the links. Browsers may operate together with browser extensions, and in this case, the combination may be referred to herein as a browser, without specific additional mention of the browser extension. Web pages may include references, such as URLs, to other network resources that contain images or other data that is retrieved by the browser from the network or a cache memory when executing the web page, and may also include references to programs, libraries, style sheets, scripts, and the like which are called by the browser when executing the web page. Some of these items may require prior separate loading onto the computer (for example Flash and a Java Virtual Machine). Any of these items that are accessed, used, and/or retrieved during browser execution of web page syntax are considered to be included as a component of the "web page" as that term is used herein. Examples of browsers include Internet Explorer distributed by Microsoft, and Chrome distributed by Google. Example web page syntax that can be executed by browsers is the various versions of HyperText Markup Language (HTML) promulgated by the World Wide Web Consortium (W3C).

Server: Processing hardware coupled to a computer network having network resources stored thereon that is configured with software to respond to client access requests to use or retrieve the network resources stored on the server.

Network Resource Identifier: A definition of a network resource (for example by storage location and filename) that is used by client computers to specify a network resource in access requests issued to the network by the client computers. A network resource identifier may also be referred to as a location of a network resource such as an image or a web page. Currently, when the network is the Internet, network resource identifiers may be referred to as URLs (an acronym for Uniform Resource Locator) that are formatted in accordance with RFC 3986 of the Internet Engineering Task Force (IETF). For the purposes of this disclosure, any format for specifying a network resource in client access requests issued to a network is within the definition of the term Network Resource Identifier. A network resource identifier, including URLs as currently defined on the Internet, may further include data in addition to data identifying the network resource that a server hosting the network resource associated with the network resource identifier may use for other purposes beyond identifying the requested network resource.

Web Server: A server that includes functionality for responding to requests issued by browsers to a network, including, for example, requests to receive network resources such as web pages. Currently, browsers and web servers format their requests and responses thereto in accordance with the HyperText Transfer Protocol (HTTP) promulgated by the IETF and W3C.

Link: Syntax that instructs a browser executing the syntax to access a network resource defined directly or indirectly by the syntax. The link syntax and/or internal browser functionality may also define conditions under which the access request is made by the browser, for example through cursor position and/or other interaction with an I/O device such as a keyboard or mouse. Some link syntax may cause the browser to access the specified network resource automatically while processing the syntax without user prompt or interaction. Links include HTML hyperlinks. A link may be directly coded with, for example, HTML tags and an explicit URL, or may be in the form of a script or other called function defined in a browser, in a browser extension, and/or in a webpage.

Network Resource: A web page, file, document, program, service, or other form of data or instructions which is stored on a network node and which is accessible for retrieval and/or other use by other network nodes.

Project: As used herein, a "project" may refer to a video project, a movie, television program, web-series, steaming video, web television, music, story, or other entertainment medium. While the present disclosure is made in reference to movies and other video-based projects, other projects are envisioned within the scope of this disclosure, for example, construction and structural projects, artistic projects, written projects, books, stories, video games, board games, etc. It will be appreciated that the present disclosure is not limited to entertainment media and projects; a project may refer to any undertaking proposed by a user of the systems and devices described herein.

Creator(s): A "creator," as used herein, refers to a user of the system who proposes and uploads a project to the systems as described herein. A creator may have an idea or concept for a project. The creator may wish to develop and produce the project and is seeking investors, providers, and vendors to assist with developing the project. Thus, the creator may utilize the systems and devices described herein to connect with other users to facilitate the production of the project.

Fan(s): A "fan," as used herein, is any user of the system. A "fan" may seek to view projects hosted by the systems described herein by accessing the web pages associated therewith. A "fan" may be an investor, provider, creator, and vendor. Fans, as used herein, may be any user seeking to interact with, view, and otherwise exhibit interest in one or more project web pages hosted by the systems described herein.

Investor(s): An "investor" is may be individual investors, accredited investors, non-accredited investor, and the like. An investor may be any entity or individual that seeks to invest in a particular video project.

Provider(s): A "provider" may be any individual or entity that may assist with the production and distribution of a project. In the context of movies, "providers" may refer to individuals with know-how or access to persons to assist with the brining a concept through production and distribution into a finalized movie (for example, filmmakers). For example, such individuals, without limitation, may be producers, screen-play writers, directors, videographers, etc. In some embodiments, the provider(s) may be referenced as "makers".

Vendor(s): A "vendor" is any individual or entity having products or property for inclusion in a project (for example, as product placement). For example, an automobile manufacture may seek to offer products for use in producing a project for advertisement in the form of product placement. Other products are possible. Similarly, owners or agents of owners with control of locations and destinations, such as but not limited to, property, hotels, landmarks, etc. may be offered for use in a project.

Blockchain/Distributed ledgers: A "blockchain" is a list of records, for example, blocks, which are linked and secured using cryptography and which may grow as additional records are added to the list. The blocks generally include records of previous blocks, time information, and transaction information or data. Each blockchain is generally distributed, generally providing unilateral resistance to modification or corruption of data contained in the blockchain or any blocks therein. The blockchain may generally provide a distributed ledger that can be used to permanently record information of transactions such that they are easily and publicly verifiable. When used in conjunction with the distributed ledger, the blockchain may be managed by a peer-to-peer (P2P) network that utilizes a specific protocol or protocols for validating new blocks and providing consensus to the information in the blockchain. Generally, data stored in the blocks of the blockchain cannot be altered retroactively without the alteration of all corresponding distributed blocks. In some embodiments, the blockchain may be used in conjunction with the projects and other associated resources described herein.

Example Networked Communication System

FIG. 1 illustrates a high-level overview of an example networked system for producing a video project. FIG. 1 is a block diagram depicting one embodiment of a networked system as described herein, for example, a project management system 102. The project management system 102 may be configured to electronically interact with a plurality of different entities. For example, the project management system 102 may communicate with creators 103, fans 104, investors 105, vendors 106, and providers 108. Each entity can log on to the project management system 102 using an access device (for example, FIG. 2) through a web browser in order to input data and/or access data from the project management system 102. It will be appreciated that, while a single entity of each type is discussed, more entities of each type may be included, for example, a plurality of creators 103, fans 104, investors 105, etc. In an embodiment, the project management system 102 can be configured to interact with creators 103. For example, creators 103 can log on to the project management system 102 using the access device (for example, FIG. 2) comprising a web browser in order to input data and/or access data from the project management system 102.

In an embodiment, the project management system 102 can be configured to interact with creators 103. The project management system 102 can be configured to allow creators 103 to access the system through a web browser that allows creators 103 to post projects or other project investment opportunities to the system 102. For example, the creators 103 may create a personal web page representative of the project and the web page may be hosted by the project management system 102. The web page may comprise images related to the project (for example, one-sheets, posters, etc.), textual information describing the project and/or persons involved, a status of the project, videos related to the project (for example, trailers, informational videos, etc.), and other media.

In an embodiment, the project management system 102 can be configured to interact with fans 104. In an embodiment, the project management system 102 can allow fans 104 to access the system via a web browser in order to peruse and/or search web pages of projects hosted by the project management system 102. In an embodiment, the project management system 102 can be configured to allow fans 104 to interact with the web pages, for example, by reviewing data contained therein and or executing hyperlinks. In an embodiment, the web page of a project may include buttons that activate hyperlinks allowing a fan 104 to interact with a selection functionality.

In one example, the fans 104 may select an interest level in the project, for example, by selecting whether they would "watch", "invest", "watch and invest", or "do nothing" with respect to a particular project. In this way, the fan can express interest in a particular project. The selection functionality may not be indicative of an actual action taken by the fan (for example, the fan may not actually invest and/or watch). However, the fans' selection may be correlated by the creators to determine an interest level in their project. The project management system 102 may include a database for tracking of the fans' activity and ranking of a particular project. In an embodiment, the project management system 102 can allow a fan 104 to subscribe or be otherwise associated with a project (for example, following a project). The project management system 102 can generate notifications and updates concerning the project that are transmitted to the fan 104. In an embodiment, the project management system 102 can be configured to store data of activity of the fans 104 within the project management system 102. In an embodiment, the project management system 102 can be configured to analyze the data of the fans 104 in order to generate an activity level or other indication of how active the investor 108 was in project management system 102. In an embodiment, the project management system 102 can be configured to provide a direct communication pathway to the other users of the project management system 102 based in part on the activity level of a fan 104.

In an embodiment, the project management system 102 can be configured to interact with providers 108. In an embodiment, the project management system 102 can allow providers 108 to access the system via a web browser in order to peruse and/or search web pages of projects hosted by the project management system 102. For example, providers 108 may interact with the project management system 102 to peruse project web pages and transmit data indicative of an offering of services to facilitate the production of a project. In an embodiment, the project management system 102 can be configured to allow providers 108 to post service opportunities on the system. For example, similar to creators 103, the providers 108 may create personal web pages representative of the services that may be used by creators to develop and produce the project.

In an embodiment, the project management system 102 can be configured to interact with vendors 106. In an embodiment, the project management system 102 can allow vendors 106 to access the system via a web browser in order to peruse and/or search web pages of projects hosted by the project management system 102. For example, vendors 106 may interact with the project management system 102 to peruse project web pages and transmit data indicative of an offering of products and/or destinations for product placement opportunities. In an embodiment, the project management system 102 can be configured to allow vendors 106 to post products and/or destinations on the system. For example, similar to creators 103, the vendors 106 may create personal web pages representative of the products and/or locations that may be used by creators in projects.

In an embodiment, the project management system 102 can be configured to interact with investors 105, either individuals or entities. In an embodiment, the project management system 102 can allow investors 105 to access the system via a web browser or other access device in order to peruse data relating to projects available and/or presented on the project management system 102. In an embodiment, the project management system 102 can be configured to store data of investments made by the investors 108. In an embodiment, the project management system 102 can be configured to analyze the data of the investors 108 in order to generate an activity level or other indication of how active the investor 108 was in project management system 102.

It will be appreciated that any given user or individual may be considered to be one or more entities depending on the functions of the project management system 102 being utilized by each individual. For example, a fan 104 may also be an investor 105 if the fan seeks to invest as well as follow a project uploaded in the project management system 102. Similarly, a vendor 106 may also perform functions on the project management system 102 such that the vendor 106 may be a fan 104 as well. Other possibilities and configurations are envisioned within the scope of this disclosure.

Example Networked Communication System

Figure 2:
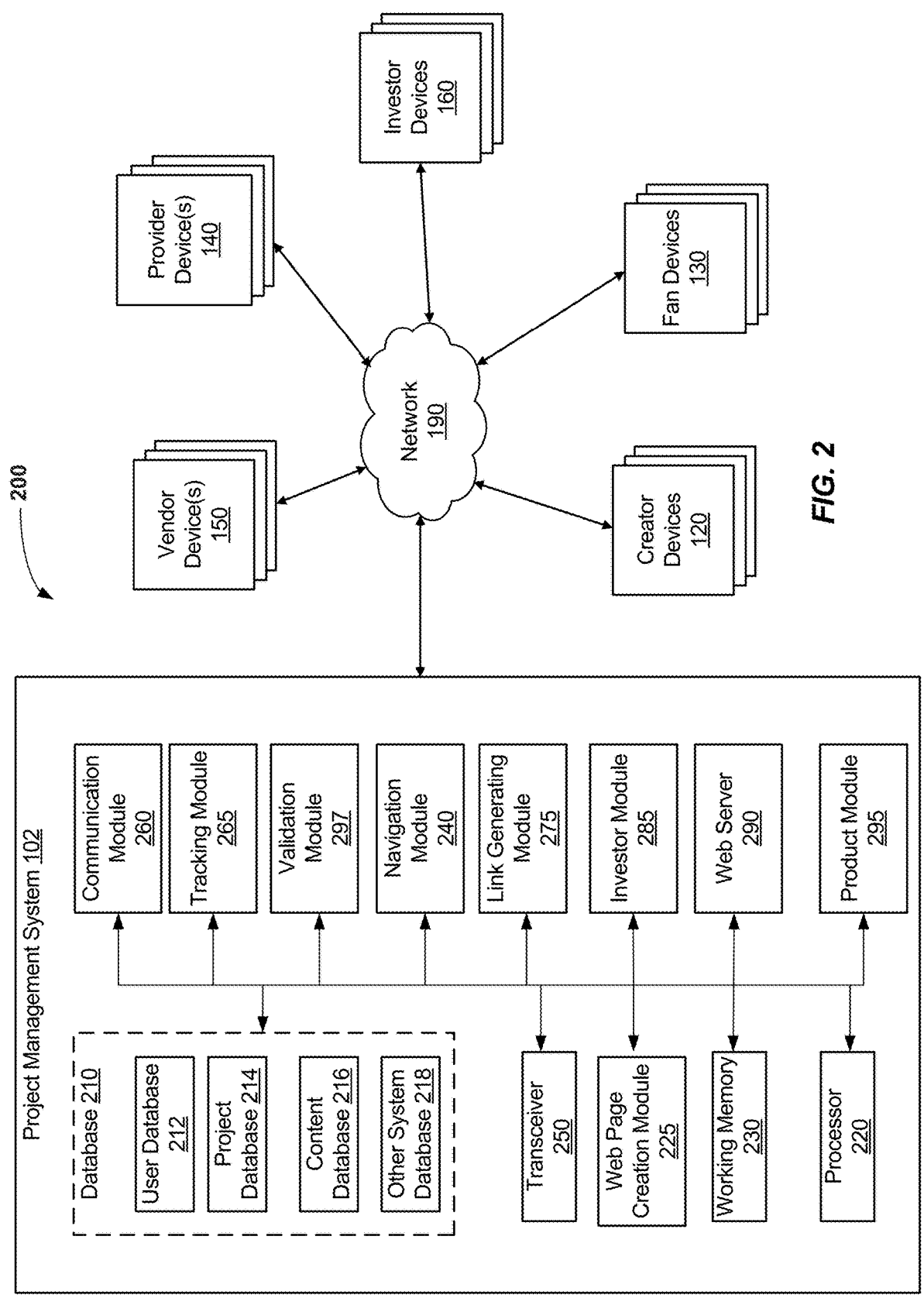
FIG. 2 illustrates an example functional block diagram of an exemplary project management system as integrated with a communication network.

FIG. 2 illustrates an example functional block diagram of an exemplary communications network system. FIG. 2 depicts a high-level overview of a networked communication system 200 comprising the project management system 102 configured to interact with a plurality of users through user devices connected by a network 190. While the following description is made in reference to wireless communication over the network 190, the various components illustrated in FIG. 2 and throughout this disclosure may be in wired or wireless communication.

In an embodiment, the project management system 102 may comprise one or more processors 220 operatively connected to a working memory 230, one or more non-transitory databases 210, and web server 290. The database 210 may comprise a plurality of databases, including but not limited to, a user database 212, a project database 214, a content database 216, and additional database 218. The user database 212 may be configured to store data associated with the users of the project creation system, for example, the user database 212 may separately store data associated with each creator(s), fan(s), vendor(s), investor(s), and provider(s). In some embodiments, the processor may be configured for use with or implementation of a blockchain or distributed ledger system. For example, the processor may be configured to generate new blocks for addition to a system blockchain.

In some embodiments, the working memory 230 may be utilized by the processor 220 to store data dynamically created during operation. For example, instructions from any of the modules or databases 210 may be stored in working memory 230 when executed by the processor 220. The working memory 230 may also store dynamic run time data, such as stack or heap data utilized by programs executing on the processor 220.

The databases 210 may be utilized to store data created the project management system 102. The databases 210 may include both read-only memory (ROM) and random access memory (RAM) configured to store, at least for example, instructions, software, and the audiovisual content. The databases 210 can be used to store digital files, for example, a DCP, software, executable instructions, configuration settings, calibration information, audiovisual content files, access parameters, and the like. Software shall be construed broadly to mean any type of instructions, whether referred to as software, firmware, middleware, microcode, hardware description language, or otherwise. Instructions may include code (for example, in source code format, binary code format, executable code format, or any other suitable format of code). A portion of the databases 210 may also include non-volatile random access memory (NVRAM). Further, in some embodiments, the databases 210 can comprise a plurality of hard drives, such as those operating under a RAID protocol. However, any type of storage device can be used.

In some embodiments, the project database 214 may be configured to store data associated with the projects and which may be transmitting data representative of the web page to a web browser. In some embodiments, the content database 216 may be configured to store data locally within the project management system 102, for example, video files, image files, etc. In some embodiments, the database 218 may comprise, among other things, a plurality of modules that store data values defining instructions, that when executed, configure the processor 220 to perform the functions of the project management system 102, as described below. The project management system 102 may comprise general purpose processing hardware and may be a single computer or may be distributed among multiple different computers.

User devices may include, but are not limited to, creator devices 120, fan devices 130, provider devices 140, and vendor devices 150 (sometimes referred to herein as "user devices"). It will be appreciated that, while a single user device of each type is discussed, the system may include a plurality of each type of device connected to the project management system 102. In some embodiments, a creator 103 (FIG. 1) may operate a creator device 120; a fan 104 may operate a fan device 130, a vendor 106 may operate a vendor device 150; and so on.

The network 190 may include a wide area network (WAN), metropolitan area network (MAN), local area network (LAN), wireless local area network (WLAN), or personal area network (PAN) which may be or may be connected to the Internet. Although shown as one network, the network 190 may include several interconnected networks. The networks which may be included in the networked communication system 100 may differ according to the switching and/or routing technique used to interconnect the various network nodes and devices (for example, circuit switching vs. packet switching), the type of physical media employed for transmission (for example, wired vs. wireless), and the communication protocols used (for example, Internet protocol suite, SONET (Synchronous Optical Networking), Ethernet, etc.). Regardless of the form the network 190 may take, the network 190 is configured to facilitate machine-to-machine messaging for tagging and communication as described herein.

In an embodiment, the project management system 102 may generate, host, and facilitate interaction with webpages associated with a particular user as described below. For example, a user may access the project management system 102 via network 190 through a browser running on a given user device to generate a webpage containing user defined project. In some embodiments, the operator of the project management system 102 may define certain parameters for constraining the type of project, format of the webpage, and guidelines for generating the webpage.

In an embodiment, the content project management system 102 may comprise a web page creation module 225. In some embodiments, the web page creation module 225 may include instructions, that when executed, cause the processor(s) 220 to generate a web page associated with a project. For example, the web page creation module 225 may receive data from a creator device 120 for generating a web page associated with a project.

In an embodiment, the content project management system 102 may comprise a navigation module 240. In some embodiments, the navigation module 240 may include instructions, that when executed, cause the processor(s) 220 to manage the navigation of user devices within the project management system 102. For example, a fan device 130 may send data to the project management system 102 requesting a web page associated with a given project. In response to a request from a user device, instructions in the navigation module 240 may cause the processor 220 to retrieve a requested web page for presentation on the user device.

In an embodiment, the content project management system 102 may comprise a communication module 260. In some embodiments, the communication module 260 may include instructions, that when executed, cause the processor(s) 220 to manage communications between user devices (for example, the fan device 130 and creator device 120, the investor device 160 and the creator device 120, etc.).

In an embodiment, the content project management system 102 may comprise a tracking module 265. In some embodiments, the tracking module 265 may include instructions, that when executed, cause the processor(s) 220 to track activity associated with users and/or projects with the project management system 102.

In an embodiment, the content project management system 102 may comprise a link generator module 275. In some embodiments, the link generating module 275 may include instructions, that when executed, cause the processor(s) 220 to generate a unique network resource identifier based in part on the activity associated with users and/or projects. In an embodiment, activity associated with the unique network resource identifier may be used by the tracking module 265.

In an embodiment, the content project management system 102 may comprise an investor module 285. In some embodiments, investor module 285 may include instructions, that when executed, cause the processor(s) 220 to provide opportunities and manage investments in projects associated with web pages. For example, the investor module 285 may receive data from an investor device 160 via a web page associated with a project. The data may be representative of an investment in the project associated with the web page. The investor module 285 may include instructions for managing these investments and returns and correlating investments with users and/or projects.

The project management system 102 may be configured to allow transmission and reception of data from the project management system 102 and the network 190, such as for example user devices. For example, the project management system 102 may be configured to process, send, receive, construct, and/or interpret information over a network connection or physical connection. In an embodiment, the project management system 102 may include a transceiver 250 configured to facilitate wireless communication over the network 190 described herein. The transceiver 250 can be configured to receive data for storage and processing by the project management system 102. The transceiver 250 may be a single component or a separate transmitter and receiver (not shown). A single or a plurality of transceiver antennas may be attached to the project management system 102 and electrically coupled to the transceiver 250. The project management system 102 may also include (not shown) multiple transmitters, multiple receivers, and multiple transceivers.

Figure 3:
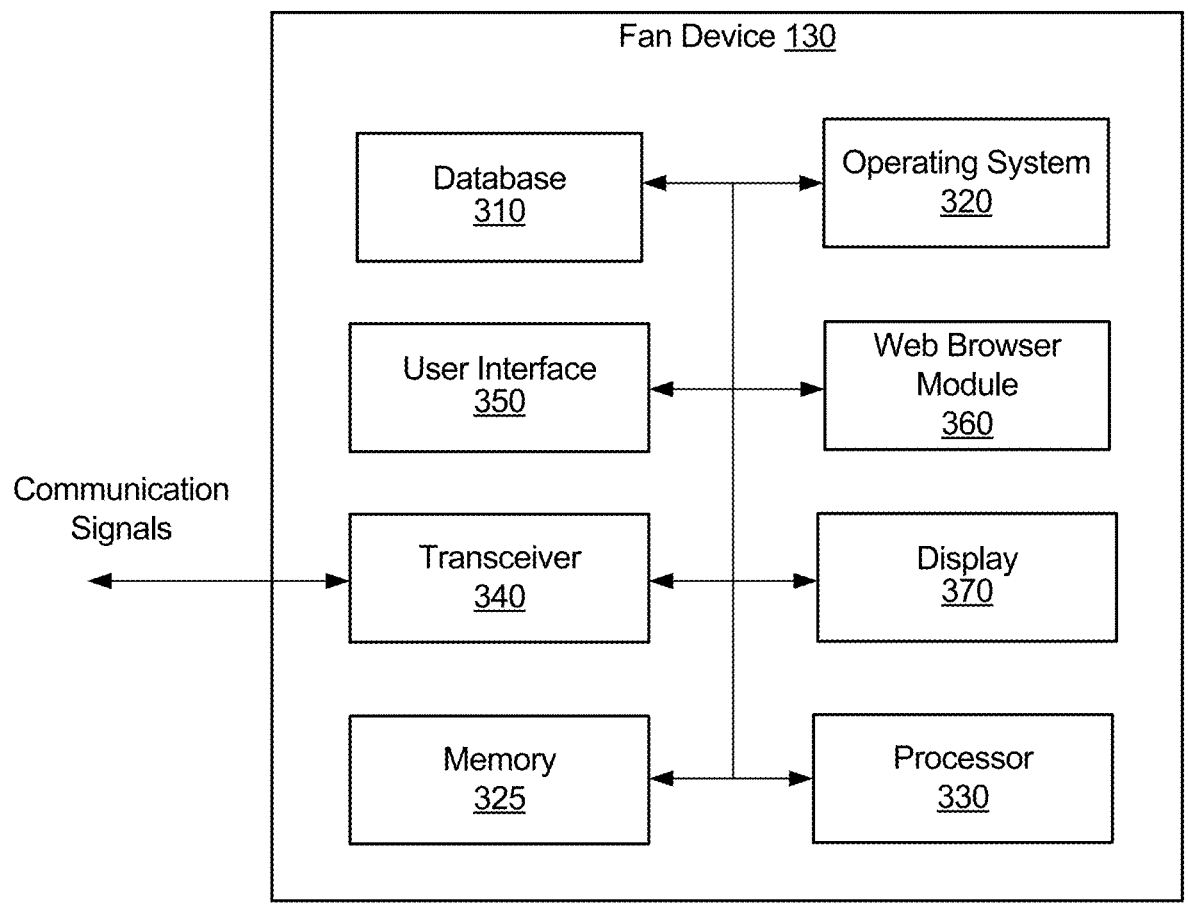
FIG. 3 illustrates an example functional block diagram of a communication device.

FIG. 3 illustrates an example functional block diagram of a fan device 130. However, it should be realized that a similar device could be used as the vendor device 150, provider device 140, investor device 160, or creator device 120. The fan device 130 may be employed within a communication network, such as the project creation system 200 of FIG. 2. In some embodiments, the fan device 130 may be any type of user device (for example, a creator device 120, etc. of FIG. 2). The fan device 130 can include hardware and software sufficient to accomplish the functionality described herein. The fan device 130 may be configured to receive data from the project management system 102, assemble project web pages, and interact with the web pages via a web browser.

The fan device 130 may comprise general purpose processing hardware and may be a single computer or may be distributed among multiple different computers. The fan device 130 may include one or more processors 330 and a database 310, such as non-transitory computer storage. The database 310 may be similar to the database 210 described. In some embodiments, database 310 may be configured to be compartmentalized into a plurality of modules. In some embodiments, one of the modules may be an operating system 320. The operating system 320 may configure the processor 330 to manage the database 310 and the processing resources of the fan device 130 for various operational tasks. For example, operating system 320 may include device drivers to manage hardware resources to perform instructions to accomplish the functionality described herein, for example, managing the web browser via the web browser module 540. Instructions within operating system 320 may then interact directly with these hardware components.

The processor 330 can be configured to provide computational power and to direct and coordinate the execution of functions sufficient to provide the targeted and desired functionality of the fan device 130. The database 310 may be configured to provide instructions and data to the processor 330. The instructions, when executed by the one or more processors 330, may cause the processor to perform the various functions described herein. Accordingly, the processor may include, for example, hardware, firmware, and software, or any combination therein.

The fan device 130 may be configured to allow transmission and reception of data between the fan device 130 and the network 190, such as for example the project management system 102. For example, the fan device 130 may be configured to process, send, receive, construct, and/or interpret information over a network connection or physical connection. For example, the fan device 130 may include a transceiver 320 to facilitate wireless communication over the network 190 described herein with reference to FIG. 2. The transceiver 340 can be configured to receive data for storage and processing by fan device 130. The transceiver 340 may be a single component or a separate transmitter and receiver (not shown). A single or a plurality of transceiver antennas may be attached to the fan device 130 and electrically coupled to the transceiver 340. The fan device 130 may also include (not shown) multiple transmitters, multiple receivers, and multiple transceivers.

The fan device 130 may further comprise a user interface 350 in some aspects. The user interface 350 may comprise a keypad, a microphone, a speaker, touchscreen, and/or the display 370. The user interface 350 may include any element or component that conveys information to a user of the fan device 130 and/or receives input from the user. In some embodiments, the user interface 350 may be included in the fan device 130 or may be remotely connect to the fan device 130.

The various components of the project management system 102 and the fan device 130 may be coupled together by a bus system, respectively, which may include a power bus, a control signal bus, and a status signal bus in addition to a data bus.

Each user of the project management system 102 may be associated with a user identifier stored in the user database 212. For example, the user may generate or be provided a username associated with a user identifier and a password for accessing the project management system 102. The username may be associated with a personal webpage hosted by the project management system 102. For example, each user may supply inputs to the project management system 102, via the fan device 130, to generate a webpage including project, data, and information associated with a particular user. In some embodiments, the user identifier may be associated with a particular user device and/or user. Accordingly, each user may have a webpage or user profile that includes details about the user.

As described above in connection to FIG. 3, user devices may be configured to communicate with the project management system 102. As used herein, user devices may refer to a particular fan device 130, for example, a creator device 120 may be implemented as a fan device 130. In an embodiment, a creator device 120 may utilize a web browser module 360 to generate project web pages hosted by the project management system 102. The creator device 120 may access the project management system 102 to generate a web page, via instructions in the web page creation module 225, associated with the project craft beer reality show, including any information about the project.

Figure 4:
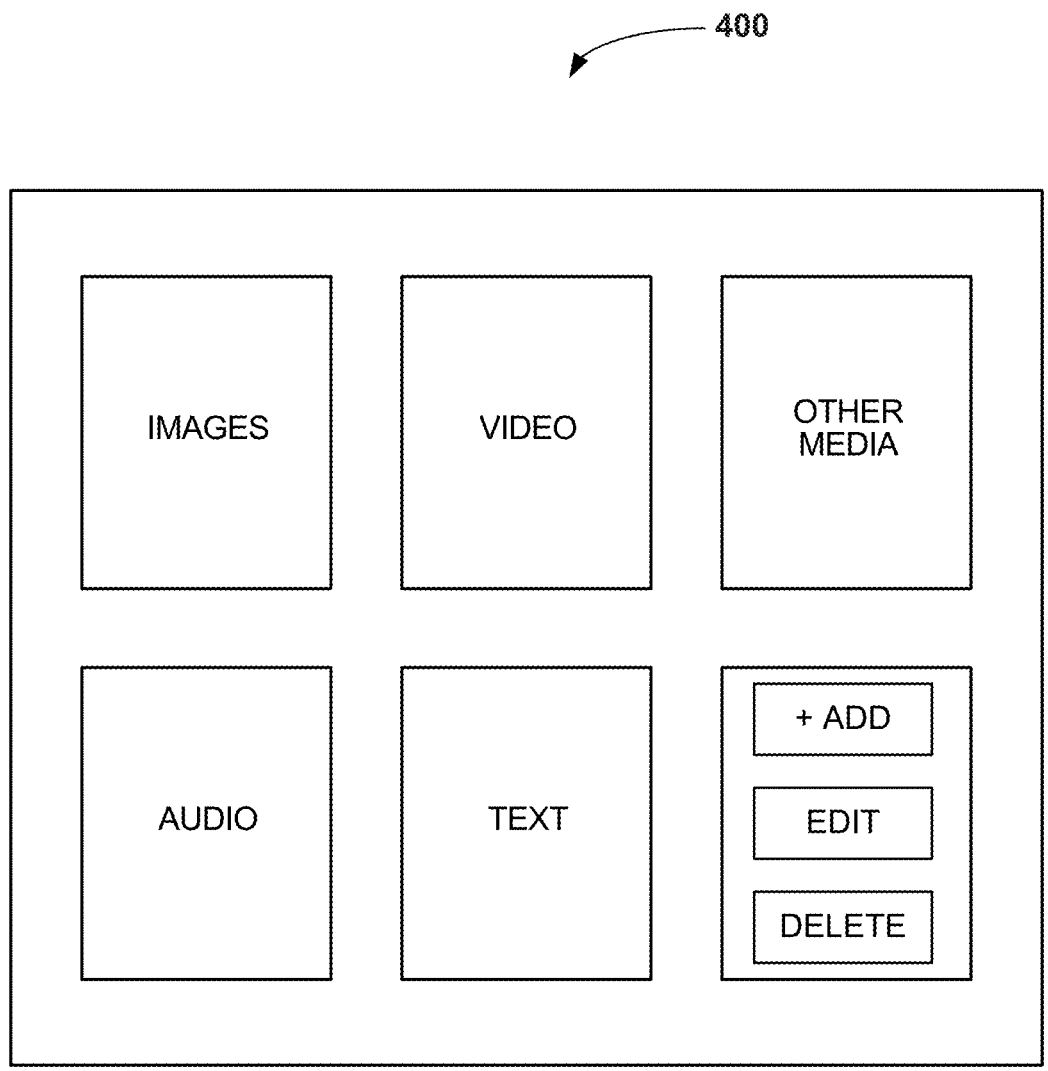
FIG. 4 illustrates an example schematic block diagram of content parameters for generating a project hosted on a project creation system.

For example, FIG. 4 illustrates an example schematic block diagram of interface 400 for use input of content for a generating a project web page hosted on a project creation system. In an embodiment, the user of the creator device 120 may implement the interface 400 via instructions in the web page creation module 225. The interface 400 may permit the creator device 120 to input content within predefined parameters. Such parameters may be controlled by the operator of the project management system 102 to provide guidance as to the type of content and formatting of the content included in each project web page. The interface 400 may be implemented in the creator device 120 over the Internet via interaction between the web browser module 360 of the creator device 120 and the project management system 102. The interface 400 may be configured to provide adding, editing, and deleting of a variety of content. For example, the content parameters may be, but are not limited to, photographs, images, textual and written media, audio media formats, and video formats, among other digital media. The content may include videos, trailers, textual descriptions, images (for example, a one-sheet or other images), audio files, and other media representative of the project. In some embodiment, the user may provide links associated with other resource destinations (for example, databases, webpages, servers, etc.) that can be retrieved by the project management system 102 over the network 190, for example from web servers (not shown). In some embodiments, alternatively or in combination, the user may upload this content to the project management system 102, which may locally store the content in database 416 and host the content. In one embodiment, the user may be able to add, delete, or edit media uploaded by the user.

While the description is made with reference to a user operating a project creation device 110, other configurations are possible. For example, similar personal web page management nodes may be implemented by the fan device 130, provider device 140, and the vendor device 150 in accordance with their functions as described below.

In an embodiment, a fan device 130 may be configured to interact with the project management system 102 to generate personal web pages hosted by the project management system 102. The user of the fan device 130 may not have a project, but may be interested in viewing and interacting with project web pages hosted by the project management system 102. The user may access the project management system 102 to generate a web page associated with the user including information about the user. The information may include user preferences and interests (for example, the types of projects that the user is interested in, specific genres, etc.), personal information (for example, location), user activity levels indicative of the user's activity within the project management system 102 as described below, user identifiers and status indicators, among other information. In some embodiments, the information may be supplied by the user (for example, preferences, interests, personal information, etc.) while other information is generated by the project creation system (for example, user identifiers, activity ratings, etc.).

The fan device 130 may be configured to navigate to a project web page hosted by the project management system 102 as described below. Upon reaching a project web page, the fan device 130 may interact with the content included therein (for example, the content described above in connection to FIG. 4). In some embodiments, a plurality of hyperlinks may be presented to the fan device 130. The hyperlinks may comprise a plurality of links each associated with a function configured to associate a level of interest with the project. This ranking may be stored in a database 414 with rankings by other fan devices 130. For example, four links may be presented giving the fan device 130 four options. In one implementation, the user of the fan device 130 may select (1) want to watch the final project; (2) financially support or invest in the project; (3) watch and support the project; or (4) none of the above (for example, not interested in the project). Based on an aggregate of the selected options from a plurality of fan devices 130, a ranking may be determined for each project.

The fan device 130 may be configured to communicate with the project source 120 as described below or with any users of the project creation system 100. For example, the project management node 200 may include a linked function supplying a pathway for communicating directly with the creator device 120. In some embodiments, the pathway for communication includes providing an email address or telephone number for contacting the user of the creator device 120. In another embodiment, alone or in combination, the means for communication may open a conversation window or communication thread hosted by the project management system 102 for contacting the creator device 120. In some embodiments, the means for communication may be a linked function to upload a review or comment to the project webpage which may be viewable by any user of the project management system 102.

The investor device 160 may be similar to the fan device 130. In addition, the investor device 160 may be configured to interact with the project management system 102 to generate personal web pages hosted by the project management system 102. The investor device 160 may be configured to navigate to a selected project web page, and interact with the content included therein. In some embodiments, the investor device 160 may transmit a request to invest in a particular project to the projection creation system 110 of the project management system 102. The request may comprise an amount to be invested, a project identifier, and an identification of the investor 160. Instructions in the investor module 285 may be executed to cause the processor to associate the investor device 160 with a project web page, and store the association in the project database 214 and/or user database 212. When the project is completed, instructions in the investor module 285 may also configure the processor to calculate and distribute returns on the investment to the investor device 160. Accordingly, in some embodiments, users operating a fan device 130 may also be a user operating an investor device 160, thereby permitting fans of projects to invest in and receive returns from projects.

The provider device 140 may be similar to the fan device 130. In addition, the provider device 140 may be associated with users who have the means to support or further production of the project. For example, the provider device 140 may generate a personal webpage containing information about one or more components of taking a project from idea to completion. For example, in the context of movies, the creator device 120 may have only an idea, but one or more provider device 140 may be associated with users who can assist with development, production, and distribution of the finalized project. The provider device 140 may utilize the project management system 102 to search for, locate, and communicate with the creator device 120. The creator device 120 may utilize the project management system 102 to locate provider device 120, and vice versa.

The vendor device 150 may be similar to the fan device 130. In addition, the vendor device 150 may be associated with users who have the products or locations that may be used in the production of the project. For example, the vendor device 150 may generate a personal webpage containing information about one or more products (for example, soda, automobiles, etc.) or locations (hotels, destinations, etc.). The vendor device 150 may be seeking product placement opportunities within the project, and may utilize the project management system 102 to locate such opportunities. Similarly, the creator device 120 and/or the provider device 140 may be seeking product placement opportunities within a project. Accordingly, the project management system 102 may facilitate the navigation and communication between these devices.

As described above, instructions stored in the various modules of the project management system 102 may, when executed, configure the processor 220 to perform the functions of the project management system 102. Referring again to FIG. 2, in an embodiment, the project management system 102 may comprise a web page creation module 225, navigation module 240, a communication module 260, a tracking module 265, a link generator module 275, and an investor module 285.

In some embodiments, the project management system 102 communicates with a creator device 120 coupled to and part of the network 190 that execute what is referred to herein as "project creation" software included in the web page creation module 425. The project creation software executing on the project management system 102 empowers a creator device 120 to define projects, described further herein, that is associated with web pages. For example, the creator device 120 may access the project management system 102 via a browser module 360 of FIG. 2. The project creation software may generate a web page associated with the creator device 120 and store the webpage, content, and associated links and network resource identifiers in one or more databases 210. The project creation software may be provided content by the creator device 120 or may retrieve content over the network 190, for example from web servers 290. Where content is so retrieved, it may be associated with network resources available on other devices of the network. As described above, web pages and associated projects hosted by the project management system 102 can later be accessed and interacted with by other users via instructions in the navigation module 240, described further below, to direct them to network resources stored in part in the database 210.

The project management system 102 may also communicate with other networked device to run what is referred to herein as "object navigation" software included in the navigation module 240. The project navigation software may empower user to view and interact with project web pages hosted by the project management system 102. The project navigation software may cause the processor 220 to retrieve the web pages or portions thereof from, for example hosted by the project management system 102.

In an embodiment, interaction with project web pages allows navigation module 240 to use network resource identifiers such as URLs generated and/or stored by the project management system 102 to navigate users to the web page where network resources associated with projects are stored. In an embodiment, the project creation software and/or the project navigation software may be implemented by, for example, a browser executed by a user device.

As described above, the project management system 102 may be connected to or include one or more databases 210. In addition, the database 210 may store data necessary of identifying and locating a user and/or web page as described herein. The database 210 may also store links, network resource identifiers, and other components for hosting personal web pages.

In some embodiments the project management system 102 performs a search of users and/or projects and displays results. A user may enter a description or search term in a search field of a web site, and the project navigation software may cause the processor to return search results comprising a list of items (for example, users or projects with a brief descriptions) having a hyperlink associated with each item. The user may scroll through the search results in order to find a desired item and select the hyperlink to be directed to the web page.

An example search may comprise a fan device 130 may send the search query to the project server node 325. After receiving the search query from, the project management system 102 may leverage a search engine to search the database. The results of the search are sent from the project management system 102 to the fan device 130 and displayed to the user via the browser of the fan device 130. In some embodiments, the user may be able to filter the search results into a list of fewer items. For example, a user may select a category or filter from a drop down menu or presented list for narrowing the search results. These categories may include, but are not limited to, project genres (for example, horror, comedy, science-fiction, drama, etc.); status of project (for example, idea only, pre-production, production, distribution, etc.); location of user; project type (for example, movie, television show, story, etc.), among others. The database 210 may store an association of categories to the various users and/or projects for tracking the user preferences and activity.

Next a user via a user device (for example, a fan device 130) may select an item from the list of search results. The user device activates a hyperlink associated with the item to retrieve the web page of the selected item. The project server node 325 retrieves the desired web page from the database 210. The retrieved web page or content therein could be retrieved, for example, from web server 290 for example by a browser. Typically, when the network is the Internet as currently configured, the HTML code of such a retrieved web page will include network resource identifiers specifying the domain and pathnames of content files that are to be used by the browser as it assembles the display of the web page at the user device. Network resource identifiers may be accessed by the browser as the web page is executed, and the specified content retrieved by the browser using the network resource identifiers.

Once the display for the web page is assembled by the browser and presented to the user, a user may access additional functionality of the project management system 102. For example, the user device may retrieve code for displaying content of the project via text or embedded hyperlinks to video or audio files.

In an embodiment, instructions in the tracking module 265 may configure the processor 220 to track activity associated with users and/or projects with the project management system 102. For example, a retrieved web page may comprise hyperlinks executable by a user for indicating an interest level in the project. The browser may display a plurality of buttons, each representing an option (as described above) for which a fan device 130 may interact with to indicate an interest level. Information indicative of an executed link may be received and stored in the database 210, which may be used to update an activity log associated with the project stored in the database 210. The activity log may be used to update a rank associated with the project based on a plurality of user selections. In some embodiments, the project rank may be used by the project management system 102 in ranking search results or as a filter category.

In an embodiment, the link generating module 275 may include instructions to cause the processor 220 to generate a unique network resource identifier based at least in part on a fan device 130 and/or a project associated with a retrieved web page. For example, data indicating the user of the fan device 130 may be received along with data indicating the project associated with the retrieved web page. Additionally, information indicating the interest level in the project, as described above, may also be received. In some embodiments, the network resource identifier is a unique URL, for example, a URL including Urchin Tracking Module (UTM) parameters configured to track activity outside of the project management system 102 associated with the project. For example, additional character strings and identifiers may be added to the URL for a given project web page. The additional characters may be used by the tracking module 265 for identifying a fan device 130 or user thereof and/or a project and updating an activity log in the database 210.

The unique network resource identifier may be transmitted to the user via the browser, at which point the user may copy the identifier for subsequent use. For example, the user may provide the unique network resource identifier to other Internet users via, for example, a social network webpage. The unique network resource identifier may also be embedded in a hyperlink, that, when executed by another user, directs this user to the project web page identified by the unique network resource identifier. The tracking module 265 may then receive an indicator that the project web page has been accessed based on the unique network resource identifier and updates the activity log of the user and/or project.

As described above, the project management system 102 is configured to facilitate the creation, management, and promotion of projects through interaction and connection between creator device 120 and fan device 130 (and other network connected devices). In some embodiments, the promotion may be through word of mouth via the tracking of user activity on the system. In other embodiments, additional functional may be provided that provides the fan device 130 an option to support the project through financial means. For example, investments by investor device 160 through the investor module 285 may be provided may be tracked and stored for use in determining the activity level of the user.

In an embodiment, instructions in the communication module 260 may cause the processor 220 to establish a direct communication pathway between users of the project management system 102. In some embodiments, the pathway may be based in part on the activity level of one or both users. For example, the processor 220 may retrieve the activity level of a given fan device 120 from the database 210. The processor 220 may also retrieve a threshold value from the database 210. Instructions in the communication module 260 may cause the processor 220 to compare the activity level with the threshold, and if the activity is equal to or greater than the threshold level, an indicator may be generated and stored in the database 210. In some embodiments, this indicator may be representative that the fan device 120 is operated by a "Super Fan," such that the associated fan is particularly active with the project management system 102. The threshold value may be determined by the operator of the project management system 102. In an embodiment, the threshold may be based on, but not limited to, one or more genres, particular projects, or entire system activity. In an embodiment, the user activity level may also be based on, but not limited to, one or more genres, particular project, or entire system activity. When the projection creation system 110 determines the user activity is at least equal to the threshold value, instructions in the communication module 260 may cause the processor to provide the user with a pathway for directly communicating with creator devices 120. For example, the user may be provided a way to communicate on, but not limited to, a per-project basis, per-genre basis, or all creator devices. The communication pathway may, for example, providing a telephone number, email address, messaging service hosted by the project management system 102, etc. If the activity level of the user is below the threshold, direct communication will be restricted.

While the foregoing description is made in reference to users of a fan device 130, similar functionality and procedures are applicable with other users and devices. For example, activity levels and searching functions may be executed in a similar manner in connection to users of the creator devices 120, provider devices 140, and/or vendor devices 150. The activity levels may be tracked and updated to facilitate the identification of particularly active users and/or users and indicate trustfulness and credibility of the users of the project management system 102.

In some embodiments, the project management system 102 and the entire networked communication system or the project creation system 200 may implement a blockchain architecture. For example, each of the user systems (for example, one of creator devices 120, fan devices 130, provider devices 140, vendor devices 150, and investor devices 160) may comprise a client node that are capable of appending new blocks to the system blockchain and for verifying or validating information in the blockchain, as described herein. For example, the project creation system 200 may utilize a blockchain to record any associated events. Accordingly, all events and transactions within the project creation system 200 may be appended to the system blockchain of the project creation system 200. In some embodiments, the implementation or utilization of the system blockchain for the project creation system 200 enables vertical and horizontal scaling of corresponding decentralized applications associated with the project creation system 200. For example, the system blockchain may provide for scaling the project creation system 200 for up to millions of users while minimizing or reducing system latency and associated costs traditionally associated with the use of smart contracts.

As used in conjunction with the system blockchain, a decentralized validation network (DVN) may aggregate votes and social actions performed by users of the project creation system 200 to provide validation, analytics, promotion, and funding of projects to creators. Essentially, the DVN may validate information in the system blockchain as information is added to the system blockchain and may validate transactions based on records in the system blockchain. The DVN may be governed by protocols that coordinate and verify actions carried out by the different users. In some embodiments, the DVN may employ different strategies for coordination, including Byzantine Agreement, gossip protocols, or conflict-free replicated data types (CRDTs). In some embodiments, the strategy for coordination used may be dependent on requirements of the project creation system 200.

The DVN may allow storage of data with unique identifiers, thereby allowing retrieval of the stored data based on the unique identifiers. The DVN may provide data integrity by requiring that user systems or devices (for example, nodes of the DVN) cannot accept altered or falsified data in response to requests. The DVN may also provide for data retrieval such that if some data has been successfully stored in storage and providers of the storage continue to follow corresponding protocols, then the stored data can be retrieved, barring any faults that may occur.

In the system blockchain utilized for or with the project creation system 200, a decentralized storage network (DSN) may provide for storage of information for users of the project creation system 200. The DSN may be auditable, publicly verifiable, and designed based on incentives, where client nodes of the DSN pay a network of storage "miners" who provide data storage and retrieval services. The storage miners may offer disk space and bandwidth in exchange for payments from the client nodes, where the storage miners may receive their payments only if the network can audit and verify that their service was correctly provided. The auditing and verification may utilize the system blockchain.

Any user, as described herein, may utilize a device (for example, one of creator devices 120, fan devices 130, provider devices 140, vendor devices 150, and investor devices 160) to participate as one or more of a client node, a storage miner and/or a retrieval miner. In some embodiments, client nodes may store and retrieve data in the DSN via the DVN in exchange for payment to storage miners and retrieval miners. The storage miners may provide data storage to the client nodes and other members of the network. The storage miners may offer service of storage requests and disk space for a specified time and for a specified price. The storage miners may generate "proofs-of-storage" (POS) that are submitted to prove to the network that the storage miners are properly storing the data. The storage miners may also mine new blocks in the system blockchain. Such new mining may provide the storage miners a mining reward for creating each block and transaction fees for any transactions included in each block. The retrieval miners may provide data retrieval to the network. The retrieval miners may retrieve data requested by users. In some embodiments, the storage miners may also be the retrieval miners.

In the project creation system 200, the network itself (for example, the various full nodes, etc.) may act as an intermediary that generally provides and runs any DSN protocols. In some embodiments, at every new block in the system blockchain, the full nodes of the network may manage available storage, validate pledges, audit proofs-of-storage, and repair possible faults. In some embodiments, the full nodes may each download every block and transaction and check them against the blockchain's consensus rules.

The project creation system 200 may utilize a ledger-based currency. At any given time, all users of the network may have access to the ledger, which may be distributed among the users of the network (for example, as part of the system blockchain). The ledger may include a sequence of transactions and may only provide for additions to the ledger. The ledger may comprise any ledger that conforms to the requirements described herein.

The project creation system 200 may provide a decentralized peer-to-peer (P2P) streaming network (DPSN). The DPSN may utilize various client nodes that function or provides roles of one or more of a transcoder, a relay, and a consumer. As the transcoder, the client node may perform a job of transcoding a content stream between codecs, bitrates, formats, etc. As the relay, the client node may distribute content streams and/or pass messages without performing any transcoding. As the consumer, the client node may be consuming the media stream or requesting the media stream for consumption (for example, viewing, etc.). Additionally, the network may utilize or incorporate a decentralized storage (for example, Swarm), decentralized logic (for example, smart contracts), decentralized messaging, and decentralized verification (for example, Truebit). Alternatives to the examples identified herein that provide similar functionality and crypto-economic guarantees may be utilized. In some embodiments, the decentralized verification may be used to verify or determine that particular jobs or tasks were correctly performed, based on which rewards and/or fees may be allocated to associated service providers. In some embodiments, the project creation system 200 may utilize the decentralized verification randomly or periodically to only verify a small percentage of segments (for example, portions of the system blockchain) randomly, and using slashing in the case of failed verifications. In some embodiments, the project creation system 200 may establish a verification rate, which may control how frequently a specific segment or segments of the system blockchain is to be selected for challenge or verification using the decentralized verification. In some embodiments, a randomness of a future block hash may determine which segments are selected for verification.

The project creation system 200 may utilize an architecture comprising a consensus layer, a content distribution layer, a real-time layer, payment channels, and an identity system. The consensus layer may provide for use of smart contracts, which may maintain a ledger of ownership, authenticity and curation within the network. In some embodiments, the smart contracts are referred to as projects. Each project have include unique content (for example, media content), one or more owners, and validation data. Each project may comprise an individual block on the blockchain of the project creation system 200. Users may connect to the project creation system 200 via client nodes (for example, one of creator devices 120, fan devices 130, provider devices 140, vendor devices 150, and investor devices 160) to obtain updates (for example, identify current stage) for any projects they are part of or associated with or to simply validate information.

The content distribution layer may provide for the distribution of content or project information, etc., to client nodes. In some embodiments, the content distribution layer of the project creation system 200 may use the DSN and the DPSN described herein to distribute the content to client nodes. The real-time layer may provide for decentralized messaging between users of the project creation system 200. The decentralized messaging may utilize one or more of peer-to-peer connections, on-chain activity, and highly scalable application infrastructure. The payment channels may provide avenues of payment or exchange of goods or services between the users of the project creation system 200. For example, the payment channels may provide for in-system purchases and/or in-system support and/or patronage of creators. For example, the payment channels may provide for micro-payments, including but not limited to, a monthly subscription to support a creator, one-time donations to a project or, upgrading to a paid user account. The project creation system 200 may implement a decentralized identity system that may provide proof of ownership of a project and may link cryptographic public keys and signatures with account names.

As described herein, at least one benefit provided by blockchain architectures is the immutability of the blockchain. Since the records stored in the blockchain are generally unchangeable (or, at the very least, require great computing power to change), the blockchain is a natural solution for identifying dates of events for which records or evidence may later be required. For example, IP protection and risk of plagiarism and associated accusations naturally concern creators and screenwriters, especially on a platform that makes their ideas public. In some embodiments, the project creation system 200 may provide records (for example, time-stamps) or similar certification of submissions by creators, providers, etc., relating to a particular project to the project creation system 200.

In some embodiments, the project creation system 200 may use a blockchain-based consensus platform and semi-autonomous consensus work teams, organized as blockrings, to facilitate key transactions between the creators, fans and providers, including creation, audience-building, social promotion, funding and marketing, and content distribution and streaming. The blockrings may correspond to data or memory structures that may assist in shepherding a project along an evolving lifecycle. The blockrings may be implemented by the blockchain and equip it with the tools necessary to successfully build a fanbase and achieve fan validation, while providing immutable protection of intellectual property. Further, Blockrings will facilitate fan-sourced project scoring, funding, production, promotion and distribution—all on the blockchain. Blockrings manage the huge workflows necessary to make a project, connecting creators with a largely underemployed industry of actors, editors, camera and lighting professionals, crew, costume designers and other essential personnel Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Content Distribution

As content generated on or using the project creation system 200 is completed (for example, ready for distribution), the project creation system 200 (or an external system) may be used to provide for distribution of the created project. In some embodiments, distribution of the project content may comprise streaming of the project content over a network or making the project content available for download or otherwise electrically available for access by one or more entities. For example, once the project is completed and ready for distribution, the project content may be distributed to entities in exchange for compensation (for example monetary compensation, tickets, services, and so forth). In some embodiments, the project creation system 200 or the external system may include a decentralized streaming network. The decentralized streaming network may provide a social streaming service that allows for fans to vet project content and provide reviews or rankings that can be shared with other entities or fans.

In some embodiments, the decentralized streaming network may be integrated with the user webpage or profile of a user. Accordingly, viewing history of project content viewed on or via the decentralized streaming network may be used to automatically adapt the user's website or profile, which may change or impact projects that the user is associated with or that are recommended to the user. For example, if the user views many projects that have the same director or producer, the project creation system 200 may prompt the user to add that director or producer to a project the user is associated with if a director or producer is needed for the associated project. In some embodiments, the viewing history can impact the types of projects that are recommended to the user or the project content that is recommended to the user for viewing on or via the decentralized streaming network. For example, if the user's viewing history includes only comedy movies, then the project creation system 200 may adjust recommendations to the user to only include comedic projects or projects with strong comedic influence. In some embodiments, the user's involvement with projects can impact the recommendations provided by the decentralized streaming network for viewing by the user. For example, if the user is generally only involved (for example, contributed creative elements, financing, products, etc.) with action movies, then the decentralized streaming network may only recommend action movies or movies that involve extensive action sequences.

The decentralized streaming network may comprise a user-validated blockchain streaming service. In some embodiments, and as described herein, the decentralized streaming network may be built on a blockchain. In such embodiments, miners for the decentralized streaming network blockchain may host and serve files that are requested by users. The decentralized streaming network may implement a transaction ledger that tracks files requested, delivery date, time and quality, and so forth, as well as the rewards for those who are serving those files, to be awarded in tokens. In some embodiments, the decentralized streaming network may provide a gamified social viewing experience for project content available on or via the decentralized streaming network. In some embodiments, the gamified social viewing experience awards or otherwise encourages or incentivizes users to participate in the decentralized streaming network. The decentralized streaming network may provide an immersive social environment where users can consume project content but also share the consumption experience with other users in real time or time delayed via replay. Accordingly, a first user can consume the project content with one or more other users simultaneously (where the first user and the one or more other users all view the project content at the same time). Additionally, or alternatively, the first user can consume the project content with the one or more other users at different times (where the first user views the project content first and the one or more other users view the project content at a later time). In some embodiments, various content may be available for each project. For example, as entire project creation lifecycles may be available for each project, various additional content beyond the final project content may be available (for example, blooper reals, alternate endings, behind the scene footage, interviews and so forth). In some embodiments a combination of features may be provided such as real time social consumption combined with a creator interview. For example, a creator associated with a media project may provide an interview for viewing while media content for the media project is being viewed in a shared viewing. In such an embodiment, one or more viewers may be able to view the media content from the media project while receiving commentary from or participating in a dialog with one of the creators of the media project. Additionally, since the projects available on the project creation system 200 and/or the decentralized streaming network may have more fan involvement, the project content available on or via the decentralized streaming network may be generally fan-vetted.

In some embodiments, the decentralized streaming network may comprise a recommendation module or engine that dynamically generates recommendations of available or upcoming project content for each user based on various information associated with the user. For example, as described herein, the recommendation engine may use projects that the user is involved or associated with to identify project content that would likely be of interest to the user. In some embodiments, the recommendation engine may also or instead use information associated with the viewing history of the user, a rating history of the user (for example, ratings and/or rankings that the user has given other project content, providers, and so forth), other social activity of the user on the project creation system 200, and so forth.

In some embodiments, the decentralized streaming network may utilize fast, scalable, and secure storage and may provide cross-platform support. Furthermore, the decentralized streaming network, in providing a social streaming service, may allow users to comments on pages associated with other users or project content, and so forth.

In some embodiments, each project that is distributed on or via the decentralized streaming network may be provided with various information associated with the project and its project content available for consumption on or via the decentralized streaming network. For example, the decentralized streaming network may provide creators and other users involved with a project with statistical information of consumption habits and other details and reviews left by users regarding the project content and so forth. In some embodiments, access to the statistical information and/or other details and reviews may be restricted to only certain users involved with the project.

In some embodiments, the decentralized streaming network may provide for creation and distribution of Rifftrax or real-time commentary corresponding to viewing of the project content. In some embodiments, any data and/or content created in conjunction with the project content may be available to the project creator. In some embodiments, the use of tokens (discussed in more detail herein) may regulate access to the Rifftrax and/or real-time commentary or other content created in conjunction with the project. In some embodiments, the decentralized streaming network may be configured to identify users or entities that are influential to projects (for example, through non-financial means, and so forth). For example, the project creator may identify users or fans that create such Rifftrax or commentary and may request involvement from those users or fans for future projects, and so forth. In some embodiments, the decentralized streaming network may track creation of such Rifftrax and/or commentary and help other users identify the creators of the Rifftrax and/or commentary. Accordingly, the decentralized streaming network may provide tracking of users or fans that are active in creating supplemental content so that other users (including the project creator) may identify them.

Figure 5:
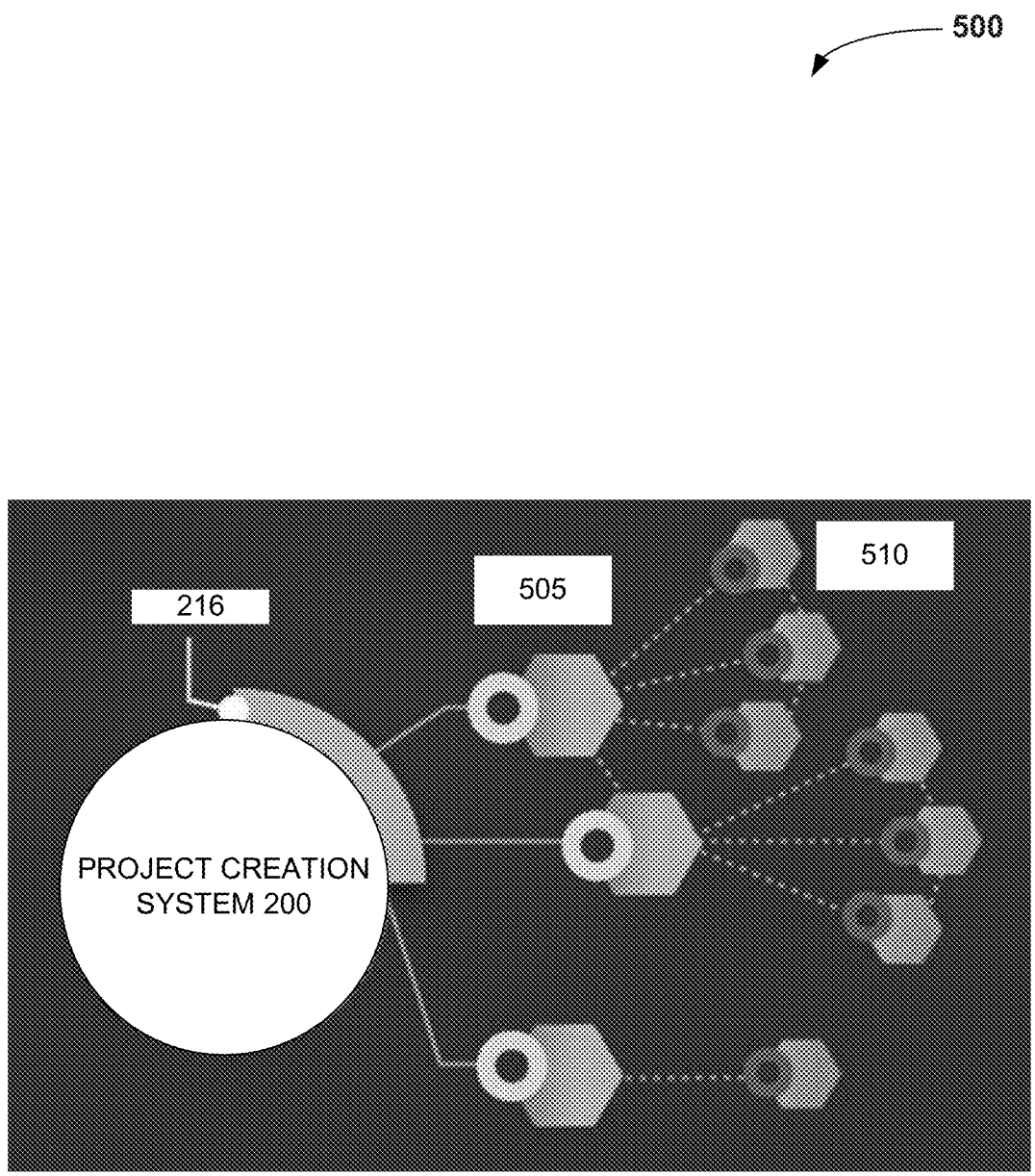
FIG. 5 illustrates a high-level overview of an example decentralized streaming network for distributing project content for projects developed at least in part with the project creation system of FIG. 2.

FIG. 5 illustrates a high-level overview of an example decentralized streaming network 500 for distributing project content for projects developed at least in part with the project creation system 200 of FIG. 2. The decentralized streaming network 500 may be shown as being integrated with the project creation system 200. However, in some embodiments, the decentralized streaming network 500 may be separate from the projection creation system 200. As shown, the decentralized streaming network 500 may comprise various layers or segments. At the core of the decentralized streaming network 500 may be the project content as generated by the project creation system 200. In some embodiments, the project creation system 200 may include a store for created content for each project that is stored in a distributed fashion on the decentralized streaming network 500. For example, the project creation system 200 may include the content database 216 that is used to store project content for distribution on or via the distribution streaming system 500. In some embodiments, the project content may be stored using systems such as a distributed file system (for example, a decentralized file system), where content is stored and verified according to one or more protocols to ensure dependable, fact, cost-effective content storage and delivery. Accordingly, the content database 216 may not be a single database but rather a distributed storage and/or filing system. Coupled to the content database 216 are multiple trusted nodes 505. Trusted nodes may be privileged, meaning that such nodes may be connected and/or accepted (for example, to or by the content database 216) even when a number of permissible peers or connections exceeds a maximum allowable peer count. Connections to trusted nodes may be reattempted according to a predetermined schedule, for example, every 15 sec. The trusted nodes 505 may provide access to the content database 216. In some embodiments, each trusted node 505 may provide project content from the content database 216 to multiple viewing users 510. In some embodiments, each of these viewing users 510 and/or the trusted nodes 505 are users of the project creation system 200.

In some embodiments, the content database 216 may include a catalog of project content developed on or with the project creation system 200 or is part of the blockchain created by the project creation system 200. In some embodiments, the decentralized streaming network 500 may provide one or more avenues for a creator or other project user to monetize the content associated with the project.

Tokens System

In the project creation system 200 and the dynamic streaming network 500, a non-fungible token may be used to provide payment or compensation for services, to permit viewing of project content and/or participation in events, and so forth. Tokens may be issued or sold for projects on the project creation system 200. In some embodiments, the tokens may be associated with the project for which they were issued or may be broadly used for anything on the project creation system 200 and/or the dynamic streaming network 500. In some embodiments, the tokens may be associated with the ledger-based currency.

In some embodiments, the tokens may be used as payment or given in exchange for services or products provided by providers for the project. In some embodiments, the tokens may be generated for pre-sale, similar to sale of physical or electronic tickets before an event (for example, a movie or concert) or during the event. In some embodiments, pricing for the tokens during the pre-sale may be less than pricing for the tickets during the event or at other stages along the project lifecycle (for example, after the project is completed but before it has been released for consumption). Accordingly, the tokens may provide an option by which the fans or other users of the project creation system 200 can support a project. For example, a user that wishes to provide support to a project may purchase a quantity of tokens relating to that project. The funds earned from the sale of those tokens may be used by the creator of the project on the project. In some embodiments, the tokens may be used for advertising. For example, the creator may choose to issue a number of tokens for giveaways or similar distribution.

In some embodiment, each token may be associated with one or more events. For example, in some embodiments, the token may be associated with or provide one viewing of the completed project. In some embodiments, the token may be associated with an online question and answer (Q&A) session with cast members, and so forth. In some embodiments, different levels or grades of tokens may be issued. For example, a first level of token may provide for one viewing of the project while a second level of token may provide one or multiple viewings of the project along with access to the Q&A session. In some embodiments, the different levels of tokens may have different prices associated with them.

In some embodiments, the tokens may be resold by the initial purchaser. For example, the tokens may be sold in an online auction house or otherwise transferred between users. In some embodiments, the tokens may provide access to viewing content created by fans or other users that is related to or based on project content. For example, in some embodiments, tokens may be used to provide access to Rifftrax or commentary provided by the fans or other users.

Other Considerations

Various aspects of the systems, apparatuses, and methods are described more fully hereinafter with reference to the accompanying drawings. The teachings of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Headings are included herein for reference and to aid in locating various sections. These headings are not intended to limit the scope of the concepts described with respect thereto. Such concepts may have applicability throughout the entire specification. The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A project processing system for social viewing, comprising:
    a hardware processor configured to execute computer-executable instructions in order to:
        receive a first request from a first viewer to view first media content of a first media project of a plurality of media projects, the plurality of media projects each comprising media content related to the respective media project and identities of one or more viewers permitted to view the respective media content;
        determine whether the first viewer is permitted to view the first media content,
        based on a determination that the first viewer is permitted to view the first media content, provide a first viewer interface to the first viewer, the first viewer interface enabling the first viewer to stream or download the first media content,
        determine, based on a second request received from the first viewer, that the first viewer requests to share viewing of the first media content with at least one additional viewer, and
        enable the first viewer to share viewing of the first media content with the at least one additional viewer, wherein the at least one additional viewer is enabled to stream or download the first media content for shared viewing with the first viewer;
        integrate the first viewer interface with a webpage or profile corresponding to the first viewer and wherein the webpage or profile corresponding to the first viewer includes one or more recommendations of media projects recommended for viewing by the first viewer based on a viewing history and/or an involvement history of the first viewer, the viewing history comprising a history of media content that the first viewer previously viewed and the involvement history comprising a history of media projects with which the first viewer has been involved as one or more of a creator, a fan, an investor, a provider, or as a vendor; and
    a communication circuit configured to provide the first media content to the first viewer and the at least one additional viewer for streaming or downloading over a network.

2. The system of claim 1, wherein the processor determines that the first viewer is permitted to view the first media content based at least in part on compensation received from the first viewer and verification that the first viewer is permitted to view the first media content.

3. The system of claim 1, wherein each media project of the plurality of media projects further comprises review or ranking information for the respective media project from one or more other viewers and wherein the processor is further configured to share the review or ranking information with users of the system.

4. The system of claim 1, wherein the processor is further configured to generate the one or more recommendations to recommend either or both of available media content or expected media content.

5. The system of claim 1, wherein the first viewer shares viewing of the first media content with the at least one additional viewer in real time, such that the first viewer and the at least one additional viewer view the first media content at the same time, or with a time delay, such that the first viewer and the at least one additional viewer view the first media content at different times.

6. The system of claim 1, wherein the processor is further configured to encourage users of the system to view media content of one or more of the plurality of media projects by providing an award or incentive to each user that views the media content of one or more of the plurality of media projects.

7. The system of claim 1, further comprising a data store configured to store the plurality of media projects based on unique account information for each of the plurality of media projects.

8. The system of claim 7, wherein the data store is further configured to store a catalog of available project media content developed using the system.

9. The system of claim 1, wherein the first media content is hosted by an entity that is compensated for hosting the first media content and serving the first media content to the first viewer, wherein a transaction involving an identification of the first media content and compensation provided to the entity is stored in a distributed transaction ledger.

10. The system of claim 1, wherein the first media content includes one or more of a blooper real, an alternate ending, behind the scenes footage, interviews, or question and answer sessions.

11. The system of claim 1, wherein the first media content is provided to the first viewer and the at least one additional viewer while a creator associated with the first media content is providing an interview, question and answer session, or real-time commentary regarding the first media project.

12. A project processing system for social viewing, comprising:
    a hardware processor configured to execute computer-executable instructions in order to:
        receive a first request from a first viewer to view first media content of a first media project of a plurality of media projects, the plurality of media projects each comprising media content related to the respective media project and identities of one or more viewers permitted to view the respective media content;
        generate a first viewer interface to the first viewer, the first viewer interface configured to enable the first viewer to stream or download the first media content,
        determine that additional content for the first media project is available for viewing by the first viewer, the additional content including an interview, a question and answer session, or real-time commentary related to the first media content, and
        enable the first viewer to view the additional content along with the first media content;
        integrate the first viewer interface with a webpage or profile corresponding to the first viewer and wherein the webpage or profile corresponding to the first viewer includes one or more recommendations of media projects recommended for viewing by the first viewer based on a viewing history and/or an involvement history of the first viewer, the viewing history comprising a history of media content that the first viewer previously viewed and the involvement history comprising a history of media projects with which the first viewer has been involved as one or more of a creator, a fan, an investor, a provider, or as a vendor; and a communication circuit configured to provide the first media content and the additional content to the first viewer for streaming or downloading over a network.

13. The system of claim 12, wherein the additional content includes one or more of an interview, a question and answer session, or real-time commentary with a creator of the first media project and wherein the first viewer interface is further configured to enable the first viewer to stream or download the additional content simultaneously with streaming or downloading the first media content.

14. The system of claim 12, wherein the processor is further configured to:

receive a second request from the first viewer requesting to share viewing of the first media content and the additional content with at least one additional viewer; and enable the first viewer to share viewing of the first media content and the additional content with the at least one additional viewer, wherein the at least one additional viewer is enabled to stream or download the first media content and the additional content for shared viewing with the first viewer, and wherein the communication circuit is further configured to provide the first media content and the additional content to the at least one additional viewer for streaming or downloading over the network.

15. A method of social viewing media content from a media project, comprising:

receiving a first request from a first viewer to view first media content of a first media project of a plurality of media projects, the plurality of media projects each comprising media content related to the respective media project and identities of one or more viewers permitted to view the respective media content;

determining whether the first viewer is permitted to view the first media content;

based on a determination that the first viewer is permitted to view the first media content, providing a first viewer interface to the first viewer, the first viewer interface enabling the first viewer to stream or download the first media content;

determining, based on a second request received from the first viewer, that the first viewer requests to share viewing of the first media content with at least one additional viewer;

enabling the first viewer to share viewing of the first media content with the at least one additional viewer, wherein the at least one additional viewer is enabled to stream or download the first media content for shared viewing with the first viewer;

integrating the first viewer interface with a webpage or profile corresponding to the first viewer and wherein the webpage or profile corresponding to the first viewer includes one or more recommendations of media projects recommended for viewing by the first viewer based on a viewing history and/or an involvement history of the first viewer, the viewing history comprising a history of media content that the first viewer previously viewed and the involvement history comprising a history of media projects with which the first viewer has been involved as one or more of a creator, a fan, an investor, a provider, or as a vendor; and providing the first media content to the first viewer and the at least one additional viewer for streaming or downloading over a network.

16. The method of claim 15, wherein the first media content is provided to the first viewer and the at least one additional viewer while a creator associated with the first media content is providing an interview, question and answer session, or real-time commentary regarding the first media project.

17. The method of claim 15, further comprising:

determining that additional content for the first media project is available for viewing by the first viewer and the at least one additional viewer, the additional content including an interview, a question and answer session, or real-time commentary related to the first media content;

enabling the first viewer and the at least one additional viewer to view the additional content along with the first media content; and providing the first media content and the additional content to the first viewer and the at least one additional viewer for streaming or downloading over a network.

18. The method of claim 17, wherein the additional content includes one or more of an interview, a question and answer session, or real-time commentary with a creator of the first media project and wherein the first viewer interface is further configured to enable the first viewer to stream or download the additional content simultaneously with streaming or downloading the first media content.

19. The method of any one of claim 17, wherein the first media content includes one or more of a blooper real, an alternate ending, behind the scenes footage, interviews, or question and answer sessions.

\* \* \* \* \*